US008290441B2

(12) United States Patent
Kurapati et al.

(10) Patent No.: US 8,290,441 B2
(45) Date of Patent: Oct. 16, 2012

(54) SIGNALING BIT DETECTION WITH ADAPTIVE THRESHOLD

(75) Inventors: Nagabhushan Kurapati, Boulder, CO (US); Matthias Brehler, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 549 days.

(21) Appl. No.: 11/019,141

(22) Filed: Dec. 20, 2004

(65) Prior Publication Data

US 2006/0135073 A1 Jun. 22, 2006

(51) Int. Cl.
*H04B 17/00* (2006.01)
(52) U.S. Cl. .................. 455/67.11; 455/452.2; 455/574; 455/343; 455/63.1; 370/208; 370/332; 370/335; 375/260; 375/340; 375/267; 375/346
(58) Field of Classification Search ............... 455/67.11, 455/458, 226.2, 127.1, 226.4, 574, 452.2, 455/343, 63.1; 370/335, 513, 115.3, 115.4
See application file for complete search history.

(56) References Cited

U.S. PATENT DOCUMENTS

| | | | | |
|---|---|---|---|---|
| 5,134,635 | A * | 7/1992 | Hong et al. ................ | 375/341 |
| 6,272,167 | B1 * | 8/2001 | Ono ........................... | 375/144 |
| 6,377,607 | B1 * | 4/2002 | Ling et al. ................. | 375/130 |
| 6,421,540 | B1 | 7/2002 | Gilhousen et al. | |
| 6,810,074 | B1 * | 10/2004 | Kim et al. ................. | 375/147 |
| 6,952,561 | B1 * | 10/2005 | Kumar et al. ............. | 455/63.1 |
| 7,203,461 | B2 * | 4/2007 | Chang et al. ............. | 455/67.13 |
| 7,212,831 | B2 * | 5/2007 | Lee ............................ | 455/458 |
| 7,386,030 | B2 * | 6/2008 | Asghar et al. ............. | 375/142 |
| 7,388,853 | B2 * | 6/2008 | Ptasinski et al. ........... | 370/338 |
| 7,471,745 | B2 * | 12/2008 | Anim-Appiah et al. ..... | 375/324 |
| 2003/0114132 | A1 * | 6/2003 | Yue ............................ | 455/343 |
| 2005/0043052 | A1 * | 2/2005 | Whinnett et al. .......... | 455/522 |
| 2005/0181731 | A1 * | 8/2005 | Asghar et al. ............. | 455/63.1 |

FOREIGN PATENT DOCUMENTS

| | | |
|---|---|---|
| JP | 2002532980 | 10/2002 |
| JP | 2004140611 | 5/2004 |
| WO | WO03053090 | 6/2003 |

OTHER PUBLICATIONS

Sarkar, Sandip, et al. (1999) Phone standby time and the quick paging channel. IEEE International Symposium on Personal, Indoor and Mobile Radio Communications, XP 001006300, vol. 3, pp. 1341-1345.
Vanghi, Vieri, et al. (2003) Performance of WCDMA downlink access and paging indicators in multipath rayleigh fading channels. The 14th Annual IEEE International Symposium on Personal, Indoor and Mobile Radio Communications, XP010681612, vol. 1, pp. 331-335.
International Search Report and Written Opinion—PCT/US2005/046294, International Search Authority—European Patent Office—Apr. 20, 2006.
Sarkar S, Phone Standby Time in cdma2000: the quick paging channel in soft handoff, IEEE Transactions on Vehicular Technology, Sep. 2001, vol. 50, p. 1240-1249, URL, http://ieeexplore.ieee.org/xplslabs~all.jsp?arnumber=950325&tag=1.

* cited by examiner

*Primary Examiner* — Marceau Milord
(74) *Attorney, Agent, or Firm* — Kyong Macek; Kristine U Ekwueme

(57) ABSTRACT

For signaling detection using an adaptive threshold, the channel condition observed by a signaling bit (e.g., a paging indicator bit) is estimated (e.g., by a pilot strength estimate). A metric for the signaling bit is computed based on recovered symbols for the signaling bit and the estimated channel condition. An adaptive threshold is selected based on the estimated channel condition. A decision is derived for the signaling bit based on the metric, the adaptive threshold, and the estimated channel condition. Multiple threshold values may be derived for the adaptive threshold for multiple ranges of estimated channel condition, one threshold value for each range. A look-up table stores the threshold values and provides the proper adaptive threshold value for any given estimated channel condition.

47 Claims, 6 Drawing Sheets

SIGNALING BIT DETECTION WITH ADAPTIVE THRESHOLD

BACKGROUND

1. Field

The present invention relates generally to communication, and more specifically to techniques for detecting signaling bits such as paging indicator bits.

2. Background

A wireless device (e.g., a cellular phone) in a wireless communication system is typically designed to operate in one of several modes, such as an "active" mode or an "idle" mode, at any given moment. In the active mode, the wireless device can actively exchange data with one or more base stations in the system, e.g., for a voice or data call. In the idle mode, the wireless device typically monitors a paging channel (PCH) for messages applicable to the wireless device. Such messages may include page messages that alert the wireless device to the presence of an incoming call and overhead messages that carry system and other information for the wireless device.

In the idle mode, the wireless device continues to consume power in order to monitor the signals transmitted by the base stations in the system. The wireless device may be portable and powered by an internal battery. Power consumption by the wireless device in the idle mode decreases the available battery power, which then shortens both the standby time between battery recharges and the talk time when a call is placed or received. Therefore, it is highly desirable to minimize power consumption in the idle mode in order to increase battery life and extend standby time.

In one common technique for reducing power consumption in the idle mode, user-specific messages are sent on the paging channel to the wireless device at designated times, if at all. The paging channel is divided into numbered PCH slots. The wireless device is assigned specific PCH slots on which it may receive user-specific messages. With such a slotted paging channel, the wireless device can operate in a "slotted" mode whereby it periodically, rather than continuously, monitors the paging channel for messages from the base stations in the system. In the slotted mode, the wireless device wakes up from a "sleep" state prior to its assigned PCH slot, enters an "awake" state, and processes the paging channel for messages. The wireless device remains in the awake state if a received message requires the device to perform additional tasks, and reverts back to the sleep state otherwise. In the time period between successive presences in the awake state, the wireless device is in the sleep state and the base stations do not send any pages or user-specific messages to the wireless device. The wireless device powers down as much circuitry as possible in the sleep state in order to conserve battery power.

In another technique for further reducing power consumption in the idle mode, a quick paging channel (QPCH) is used to indicate whether a page message might be transmitted on the paging channel for the wireless device. For cdma2000, the quick paging channel carries a number of paging indicator bits that are transmitted as binary On/Off bits. The wireless device is assigned two paging indicator bits for each QPCH slot associated with an assigned PCH slot. The wireless device is able to quickly detect the paging indicator bits and to immediately enter the sleep state without processing the paging channel if the paging indicator bits indicate that no message will be transmitted on the paging channel for the wireless device.

Accurate detection of the paging indicator bits is important to achieve good performance and improve standby time. Erroneous detection of the paging indicator bits as On when they are actually Off leads to an increase in the awake time to process the paging channel for messages that are not sent. Conversely, erroneous detection of the paging indicator bits as Off when they are actually On may lead to missed page messages, which may result in missed calls. All of these effects are undesirable.

There is therefore a need in the art for techniques to accurately detect paging indicator bits.

SUMMARY

Techniques for performing signaling detection using an adaptive threshold are described herein. These techniques may be used for various types of signaling such as paging indicator (PI) bits, broadcast indicator (BI) bits, configuration change indicator (CCI) bits, power control (PC) bits, acknowledgment (ACK) bits, and other uncoded bits.

In an embodiment for detecting a signaling bit (e.g., a PI bit), the channel condition observed by the signaling bit is estimated (e.g., by a pilot strength estimate). The channel condition encompasses all effects observed by a signal and determines the ability to reliably receive the signal. A metric for the signaling bit is computed based on recovered symbols for the signaling bit and the estimated channel condition. An adaptive threshold for the metric is selected based on the estimated channel condition. A second threshold may also be used for the estimated channel condition. A decision is then derived for the signaling bit based on the metric, the adaptive threshold, the estimated channel condition, and the second threshold. As an example, a PI bit may be declared as (1) an erasure if the pilot strength estimate is less than a pilot threshold (which is the second threshold), (2) an Off value if the pilot strength estimate is greater than the pilot threshold and the metric is less than the adaptive threshold, or (3) an On value if the pilot strength estimate is greater than the pilot threshold and the metric is greater than the adaptive threshold.

Multiple threshold values may be derived for the adaptive threshold for multiple ranges of estimated channel condition, one threshold value for each range. These threshold values may be derived to achieve the desired probability of correctly detecting a given signaling bit as a designated value (e.g., On) when the bit is transmitted as the designated value. A look-up table may store the multiple threshold values and provide the proper adaptive threshold value for any given estimated channel condition.

In one aspect, a method is presented for performing signaling detection in a communication system, comprising: computing a metric for a signaling bit; estimating channel condition observed by the signaling bit; selecting a first threshold based on the estimated channel condition; and deriving a decision for the signaling bit based on the metric and the first threshold.

In another aspect, a apparatus in a communication system is presented, comprising: a computation unit operative to compute a metric for a signaling bit; an estimator operative to estimate channel condition observed by the signaling bit; a look-up table operative to provide a first threshold based on the estimated channel condition; and a decision unit operative to derive a decision for the signaling bit based on the metric and the first threshold.

In another aspect, a processor readable media is presented for storing instructions operable to: derive a first decision for a first paging indicator (PI) bit based on a first metric value computed for the first PI bit and an adaptive threshold selected based on estimated channel condition; and selectively derive a second decision for a second PI bit based on a second metric value computed for the second PI bit and the adaptive threshold.

Various further aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
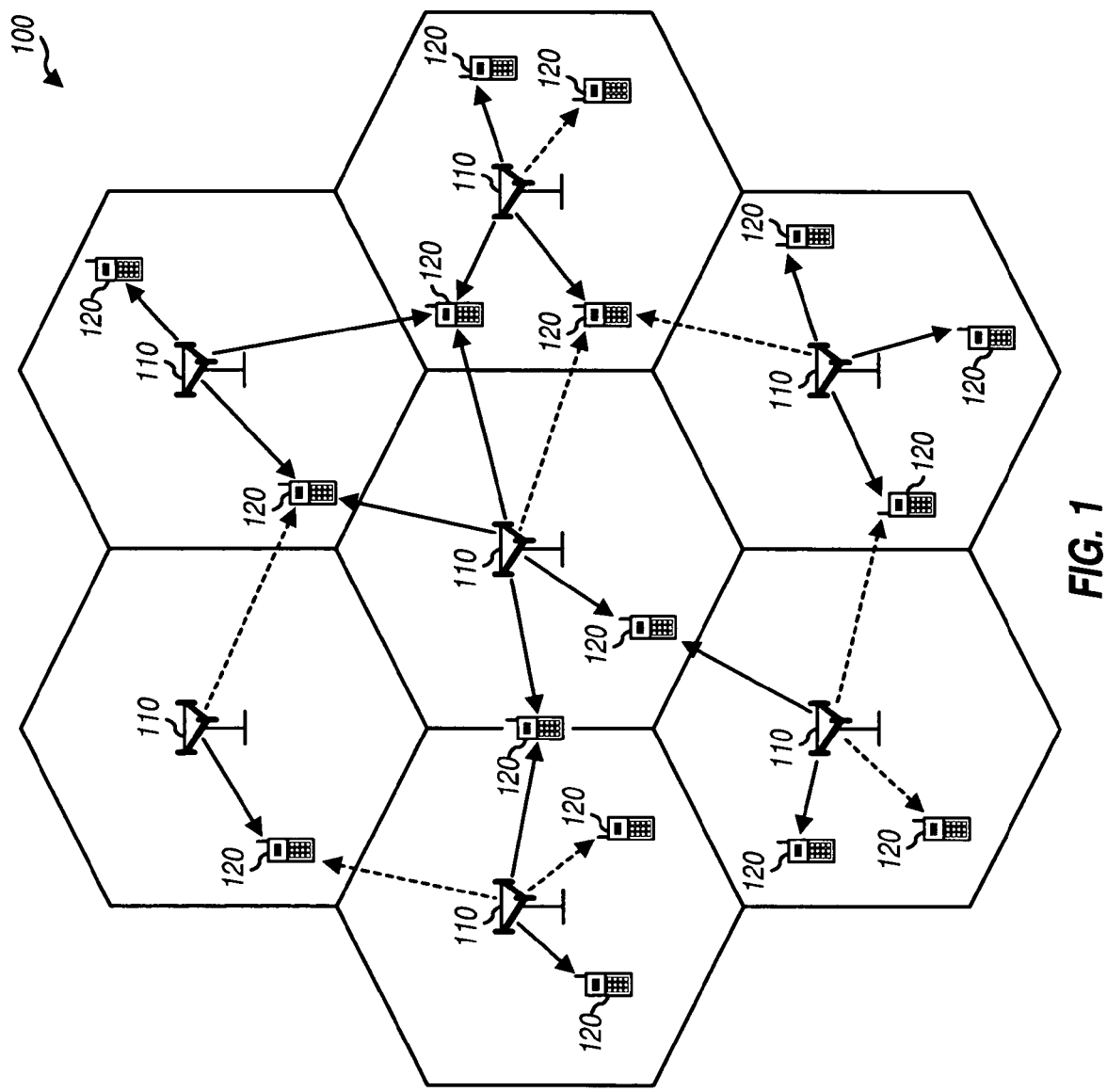
FIG. 1 shows a wireless communication system.

FIG. 1 shows a wireless communication system 100. System 100 includes a number of base stations 110 that provide communication coverage for a number of wireless devices 120. A base station is typically a fixed station that communicates with the wireless devices and may also be called a base transceiver system (BTS), a node B, an access point, or some other terminology. A wireless device may be fixed or mobile and may also be called a mobile station (MS), a user equipment (UE), a user terminal (UT), a handset, a subscriber unit, or some other terminology.

As shown in FIG. 1, the wireless devices may be dispersed throughout the system. Each wireless device may communicate with one or multiple base stations on the forward and/or reverse links at any given moment. The forward link (or downlink) refers to the communication link from the base stations to the wireless devices, and the reverse link (or uplink) refers to the communication link from the wireless devices to the base stations. In FIG. 1, a solid line with an arrow indicates a user-specific data transmission from a base station to a wireless device. A broken line with an arrow indicates that the wireless device is receiving pilot and signaling (e.g., paging indicator bits, page messages, and so on), but no user-specific data transmission, from the base station. The reverse link transmissions are not shown in FIG. 1 for simplicity.

The signaling detection techniques described herein may be used for various communication systems such as a Code Division Multiple Access (CDMA) system, a Time Division Multiple Access (TDMA) system, a Frequency Division Multiple Access (FDMA) system, an Orthogonal Frequency Division Multiple Access (OFDMA) system, and so on. A CDMA system may implement one or more CDMA radio access technologies (RATs) such as cdma2000 and Wideband-CDMA (W-CDMA). cdma2000 covers IS-2000, IS-856, and IS-95 standards. A TDMA system may implement one or more TDMA RATs such as Global System for Mobile Communications (GSM). These various RATs and standards are well known in the art. For clarity, the signaling detection techniques are specifically described below for paging indicator (PI) bits sent on a quick paging channel (QPCH) that is used in combination with a paging channel (PCH) in cdma2000.

Figure 2:
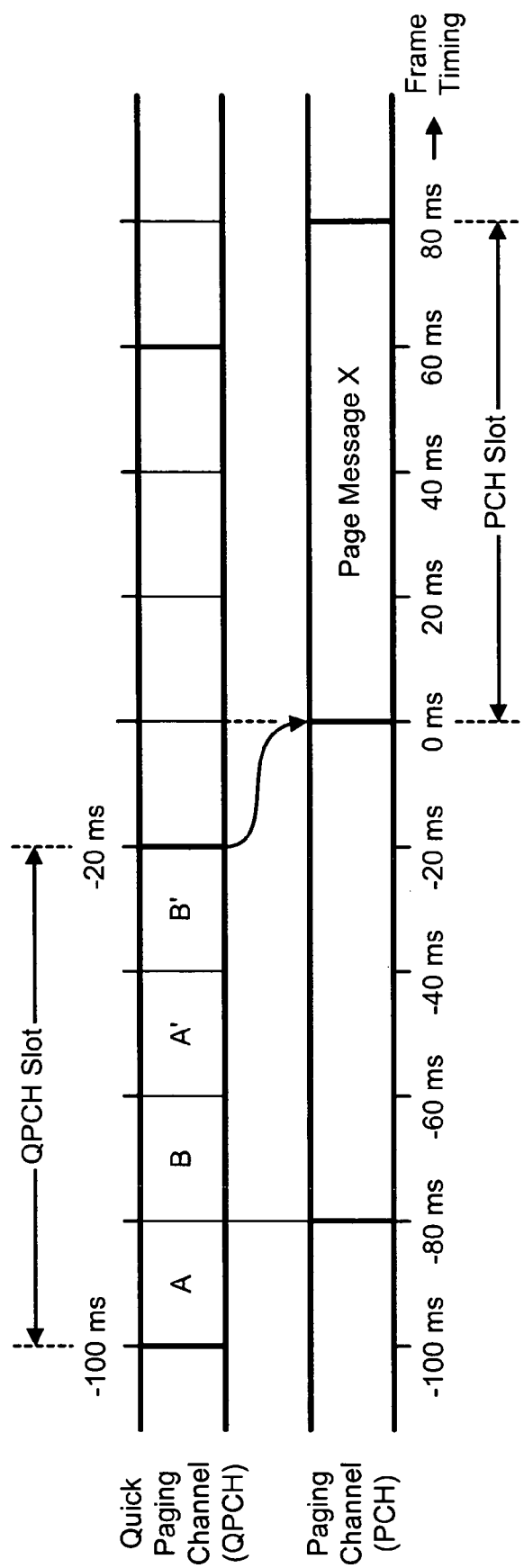
FIG. 2 shows the timing alignment of the QPCH and PCH in cdma2000.

FIG. 2 shows the timing alignment of the QPCH and PCH in cdma2000. The PCH is used to send page messages to idle wireless devices, which are wireless devices that have registered with the system and are in the idle mode. Because a page message may be sent at any time and may be relatively long, continual monitoring of the PCH for page messages may significantly deplete battery charge in the idle mode. The QPCH and PCH are designed such that the idle wireless devices only need to be active for a small portion of the time to receive page messages.

In cdma2000, the PCH is partitioned into PCH slots. Each PCH slot has a duration of 80 milliseconds (ms) and is further partitioned into four 20 ms frames. Each wireless device is assigned PCH slots that are spaced apart by a time interval TPCH, which is determined by a slot cycle index (SCI) applicable to the wireless device. The specific PCH slots assigned to each wireless device are determined by identification information for the wireless devices. This identification information may be an International Mobile Subscriber Identifier (IMSI) that is unique for each wireless device, a Mobile Identification Number (MIN), an Electronic Serial Number (ESN), a Temporary Mobile Subscriber ID (TMSI), and so on. More than one wireless device may be assigned to each PCH slot.

In cdma2000, the QPCH is partitioned into QPCH slots. Each QPCH slot also has a duration of 80 ms and is associated with one PCH slot that starts 100 ms after the QPCH slot. Each QPCH slot is further partitioned into four frames that are labeled as A, B, A', and B'. Each frame carries 192 PI bits for full rate and 96 PI bits for half rate. The QPCH may thus be transmitted at either 9600 PI bits/second for the full rate or 4800 PI bits/second for the half rate. Each PI bit is transmitted with On/Off keying so that (1) a '0' bit value representing an Off bit is transmitted with zero power and (2) a '1' bit value representing an On bit is transmitted at a designated power level. In the following description, '1', On, On bit, and On value are used interchangeably, and '0', Off, Off bit, and Off value are also used interchangeably.

Each wireless device that has registered with the system is assigned two PI bits for each assigned QPCH slot. The assigned QPCH slots are QPCH slots starting 100 ms before the assigned PCH slots. The position of each assigned PI bit is determined by a hashing function and changes from bit to bit. The pair of assigned PI bits for each assigned QPCH slot are sent such that either (1) the first PI bit is sent in frame A and the second PI bit is sent in frame A' or (2) the first PI bit is sent in frame B and the second PI bit is sent in frame B'. This transmission scheme ensures that the two PI bits are separated by at least 20 ms, and that the second PI bit arrives at least 20 ms before the start of the associated PCH slot. The QPCH is used in conjunction with the PCH and functions like a control channel for the PCH. The PI bits in each QPCH slot are quick paging signals that alert the wireless devices that a page message is about to be sent in the associated PCH slot.

When a base station sends a page message to a wireless device on the PCH (or requires the wireless device to wake up to receive new configuration information), the base station turns "On" both PI bits in the QPCH slot assigned to the wireless device. Since more than one wireless device may hash/map to, and be assigned with, any given PI bit, detecting the assigned PI bits as On does not guarantee that the wireless device will actually receive a page message (or configuration information) in the associated PCH slot. However, the wireless device may interpret a PI bit that is detected as Off to mean that the wireless device does not need to process the associated PCH slot for paging or other information. The wireless device may then power down after processing the PI bits, without processing the PCH. This early power down may greatly reduce power consumption since the page message is encoded and may be long.

Broadcast indicator (BI) bits may also be sent in similar manner as the PI bits. The BI bits are sent at a rate of 2400 BI bits/second, or quarter rate, and are thus referred to as quarter rate PI bits. The wireless devices may process the BI bits in similar manner as the PI bits.

Each base station transmits a pilot channel that carries known symbols for a pilot. The wireless devices use the pilot for various purposes such as coherent data demodulation, signal strength detection, time synchronization, frequency correction, and so on. The pilot channel is transmitted at a predetermined power level, which is denoted as $TxP_{pilot}$. The QPCH is transmitted at a power level that is offset from the pilot power level, or $TxP_{QPCH}=TxP_{pilot}+\Delta$, where $TxP_{QPCH}$ is the QPCH power level and $\Delta$ is a configurable parameter. In cdma2000, the power offset/delta $\Delta$ may be selected from the set $\{-5, -4, -3, -2, -1, 0, 1, 2\}$, where the values in the set are in units of decibels (dB). The QPCH rate and the power offset $\Delta$ are broadcast to all wireless devices via an extended system parameter message.

Figure 3:
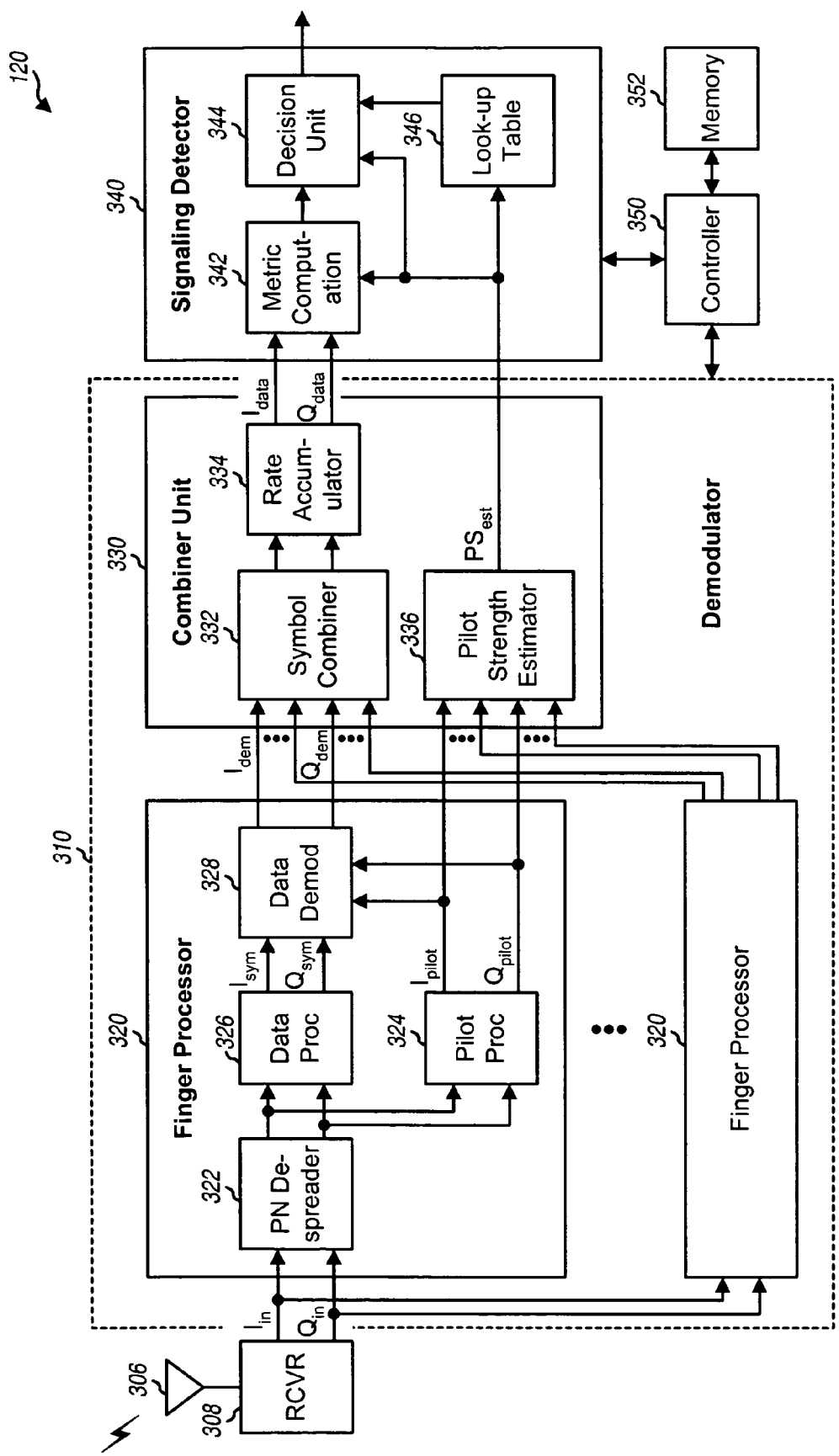
FIG. 3 shows a block diagram of a wireless device.

FIG. 3 shows a block diagram of a wireless device 120 capable of detecting PI bits sent on the QPCH. An antenna 306 receives modulated signals transmitted by base stations in the system and provides a received signal. In a multipath environment, a modulated signal transmitted by a given base station often arrives at the wireless device via multiple signal paths. The received signal from antenna 306 may thus comprise multiple instances of the modulated signal from each base station that can be received by the wireless device. Each signal instance (or multipath) in the received signal is associated with a particular magnitude, phase, and arrival time.

A receiver unit (RCVR) 308 conditions (e.g., filters, amplifies, and frequency downconverts) the received signal from antenna 306, digitizes the conditioned signal, and provides data samples, which are denoted as $I_{in}$ and $Q_{in}$. In the following description, "I" denotes an inphase component and "Q" denotes a quadrature component of a complex quantity. A demodulator 310 receives and processes the data samples from receiver unit 308. A searcher (not shown in FIG. 3) within demodulator 310 searches for strong multipaths in the received signal and identifies each multipath that meets certain criteria. One finger processor 320 is then assigned to process each multipath of interest, e.g., each multipath of sufficient strength. Each multipath that is assigned for processing is from a particular base station and has a particular arrival time. These two pieces of information are provided by the searcher.

Within each assigned finger processor 320, a pseudo-random number (PN) despreader 322 receives the data samples from receiver unit 308 and a PN sequence for its assigned multipath. This PN sequence is for the base station associated with the assigned multipath and has a time offset corresponding to the arrival time of the multipath. PN despreader 322 despreads the data samples with the PN sequence and provides despread samples.

To recover the pilot, a pilot processor (proc) 324 decovers (or multiplies) the despread samples with a Walsh code used for the pilot channel, accumulates the decovered samples over the length of the pilot Walsh code, and provides detected pilot symbols. Pilot processor 324 also filters the detected pilot symbols with a lowpass filter and provides filtered pilot symbols, which are denoted as $I_{pilot}$ and $Q_{pilot}$.

To process the QPCH, a data processor 326 decovers the despread samples with a Walsh code used for the QPCH, accumulates the decovered samples over the length of the QPCH Walsh code, and provides detected data symbols, which are denoted as $I_{sym}$ and $Q_{sym}$. A data demodulator (Demod) 328 performs coherent (or data) demodulation on the detected data symbols with the filtered pilot symbols and provides demodulated symbols, which are denoted as $I_{dem}$ and $Q_{dem}$.

A combiner unit 330 receives and combines the demodulated symbols from all assigned finger processors 320. Within combiner unit 330, a symbol combiner 332 receives the demodulated symbols from all assigned finger processors 320, aligns these symbols based on the arrival times of the assigned multipaths, and combines the time-aligned symbols. A rate accumulator 334 accumulates multiple symbols, as needed for different QPCH rates, and provides recovered symbols for the QPCH, which are denoted as $I_{data}$ and $Q_{data}$. For example, rate accumulator 334 may accumulate two symbols for full rate, four symbols for half rate, and so on. A pilot strength estimator 336 receives the filtered and/or detected pilot symbols from all assigned finger processors 320 and derives a pilot strength estimate, which is denoted as $PS_{est}$, based on these pilot symbols. The pilot strength estimate is indicative of the signal strength of the signals received by the wireless device from all base stations.

A signaling detector 340 performs detection for the PI bits. Within detector 340, a metric computation unit 342 receives the recovered symbols, $I_{data}$ and $Q_{data}$, and the pilot strength estimate, $PS_{est}$, and derives a metric for each assigned PI bit. A look-up table 346 receives the pilot strength estimate and provides an adaptive threshold that is dependent on the pilot strength estimate. A decision unit 344 receives the metric, the adaptive threshold, and the pilot strength estimate for each assigned PI bit and derives a decision for each assigned PI bit. Each PI bit decision may indicate that the assigned PI bit is detected as On ('1'), Off ('0'), or an erasure. An erasure indicates that the PI bit is too unreliable to be decided as On or Off.

A controller 350 directs the operation of various processing units at the wireless device. A memory unit 352 stores program codes and data used by controller 350.

The processing for the QPCH is described in further detail below. The demodulated symbols from data demodulator 328 for the i-th finger processor 320 assigned to process the i-th multipath may be expressed as:

$$I_{dem,i} = I_{sym,i} \cdot I_{pilot,i} + Q_{sym,i} \cdot Q_{pilot,i}, \text{ and} \qquad \text{Eq (1)}$$

$$Q_{dem,i} = Q_{sym,i} \cdot I_{pilot,i} - I_{sym,i} \cdot Q_{pilot,i}.$$

Data demodulator 328 performs a complex multiply between the detected data symbols ($I_{sym,i}+jQ_{sym,i}$) and the complex-conjugated filtered pilot symbols ($I_{pilot,i}-j Q_{pilot,i}$) to obtain the demodulated symbols ($I_{dem,i}+jQ_{dem,i}$). The data demodulation with the filtered pilot symbols removes a residual phase error that is present in the detected data symbols after the frequency downconversion process. The detected data symbols and/or the filtered pilot symbols are appropriately delayed, if needed, to account for any difference in the processing delays of pilot processor 324 and data processor 326.

The recovered symbols from rate accumulator 334 may be expressed as:

$$I_{data} = \sum_i I_{dem,i}, \text{ and} \qquad \text{Eq (2)}$$

$$Q_{data} = \sum_i Q_{dem,i}.$$

Equation (2) assumes that the demodulated symbols from all assigned finger processors are properly time-aligned and that no accumulation is performed by rate accumulator 334.

If only one finger processor is assigned and the QPCH is sent at the full rate, then the demodulated symbols, $I_{dem}$ and $Q_{dem}$, may be provided directly as the recovered symbols, $I_{data}$ and $Q_{data}$. If multiple finger processors are assigned, then the demodulated symbols from all assigned finger processors are combined as shown in equation (2). For QPCH rates lower than full rate, multiple symbols are also accumulated to obtain the recovered symbols, which is not shown in equation (2) for simplicity.

The pilot strength estimate from pilot strength estimator 336 for all assigned finger processors may be expressed as:

$$PS_{est} = \sum_i (I_{pilot,i}^2 + Q_{pilot,i}^2). \qquad \text{Eq (3)}$$

In equation (3), the pilot strength estimate is derived as the squared magnitude of the filtered pilot symbols. The pilot strength estimate may also be derived based on the detected pilot symbols (without filtering) or based on both the filtered and detected pilot symbols (e.g., with a complex multiply between the filtered pilot symbols and the detected pilot symbols).

An automatic gain control (AGC) loop is typically used to maintain the quantity $(I_{in}^2 + Q_{in}^2)$ at a predetermined value to avoid clipping by the analog-to-digital converters (ADCs) used to generate the data samples, $I_{in}$ and $Q_{in}$. The pilot strength estimate, $PS_{est}$, is thus an estimate of the pilot-energy-per-chip-to-total-noise-and-interference ratio, $E_c^P/I_o$, which is indicative of the channel condition/quality. The term $E_c^P$ is for the pilot power received by the wireless device from a single multipath. The term $I_o$ includes all in-band power received by the wireless device from all multipaths, including the pilot power. The pilot strength estimate may be used as an estimate of the channel condition observed by the wireless device at the time the PI bit is received. However, other quantities may also be used as an estimate for the channel condition. For example, the AGC level may be used in combination with a received signal strength indicator (RSSI) to estimate the channel condition.

If the PI bits are transmitted on both the inphase and quadrature components of a signal constellation with On/Off keying, then a good metric for detecting the PI bits is a quantity that is proportional to $(I_{data} + Q_{data})$. The term $(I_{data} + Q_{data})$ gives the components of $I_{data}$ and $Q_{data}$ along the (1, 1) direction at +45° from horizontal. In an embodiment, a metric $M_{QPCH}$ is defined based on the recovered symbols and the pilot strength estimate, as follows:

$$M_{QPCH} = \frac{I_{data} + Q_{data}}{PS_{est}}. \qquad \text{Eq (4)}$$

The recovered symbols are obtained after the data demodulation with the filtered pilot symbols and thus include contributions from the filtered pilot symbols. The metric $M_{QPCH}$ in equation (4) is a unitless quantity. Other metrics may also be defined based on some other function of the recovered symbols and/or the pilot strength estimate. For clarity, the following description assumes the use of the metric shown in equation (4).

$I_{data}$ and $Q_{data}$ for the recovered symbols are independent Gaussian random variables. It can be shown that the mean and standard deviation of the metric $M_{QPCH}$ have the following characteristics:

$$\mu_{metric} \propto \sqrt{\Delta}, \text{ and} \qquad \text{Eq (5a)}$$

$$\sigma_{metric} \propto \sqrt{\frac{K_a}{PS_{est}} - \frac{K_b}{E_c^P/I_{or}}}, \qquad \text{Eq (5b)}$$

where $\mu_{metric}$ is the mean of the metric for the case in which the PI bits are On;

$\sigma_{metric}$ is the standard deviation of the metric;

$E_c^P/I_{or}$ is a pilot-energy-per-chip-to-total-noise-and-interference ratio; and $K_a$ and $K_b$ are constants that are dependent on system and demodulator designs.

All of the quantities in equation (5b) are in linear units. The term $I_{or}$ includes the total in-band power received by the wireless device from a single multipath, which is the same multipath as for $E_c^P$.

Equation set (5) assumes that the noise in the pilot filter loop in pilot processor 324 is negligible. Equation (5b) indicates that the standard deviation $\sigma_{metric}$ is a function of both $PS_{est}$ and $E_c^P/I_{or}$. For a given $PS_{est}$, a higher $E_c^P/I_{or}$ results in a higher $\sigma_{metric}$. The dependency of $\sigma_{metric}$ on $E_c^P/I_{or}$ is negligible at low $PS_{est}$ values and becomes more noticeable at high $PS_{est}$ values. In general, the standard deviation $\sigma_{metric}$ may be obtained via theoretical calculation, computer simulation, empirical measurements, and so on. The standard deviation may also be obtained for different pilot strength estimates and for one or more $E_c^P/I_{or}$ values that provide good performance.

With On/Off keying, an On PI bit is transmitted with a power level of $TxP_{QPCH} = TxP_{pilot} + \Delta$, and an Off PI bit is transmitted with zero power. The mean of the metric is thus dependent on whether the transmitted PI bit is On or Off. For an Off PI bit, the metric is a Gaussian random variable with a mean of zero and a standard deviation of $\sigma_{metric}$ shown in equation (5b). For an On PI bit, the metric is a Gaussian random variable with a mean of $\mu_{metric}$ shown in equation (5a) and a standard deviation of $\sigma_{metric}$ shown in equation (5b).

An adaptive threshold, $TH_{adap}$, and a pilot threshold, $TH_{pilot}$, may be used to determine whether a given PI bit is On, Off, or erasure. Since the standard deviation of the metric is a function of pilot strength estimate, the adaptive threshold may also be made a function of pilot strength estimate and may be denoted as $TH_{adap}(PS_{est})$. The adaptive threshold may be designed to achieve the desired detection probability, $P_{det}$, and/or the desired false alarm probability, $P_{fa}$.

The detection probability is the probability of correctly detecting a given PI bit as being On when the PI bit is transmitted as On. Erroneous detection of this PI bit as being Off when transmitted as On may result in missing a page message, which may lead to a missed call. The detection probability is selected to achieve the desired probability of missing page messages, as described below. The detection probability for a given PI bit may be expressed as:

$$P_{det} = Q\left(\frac{TH_{adap}(PS_{est}) - \mu_{metric}}{\sigma_{metric}}\right), \quad \text{Eq (6)}$$

where Q(x) is an integral of a normal Gaussian distribution function from x to infinity. The Q-function is known in the art.

The false alarm probability is the probability of incorrectly detecting a given PI bit as being On when the PI bit is transmitted as Off. A false alarm may result in the wireless device processing the PCH when no page messages are sent for the wireless device. This results in additional power consumption by the wireless device and shortens standby time. The false alarm probability for a given PI bit may be expressed as:

$$P_{fa} = Q\left(\frac{TH_{adap}(PS_{est})}{\sigma_{metric}}\right). \quad \text{Eq (7)}$$

Equation (7) assumes that an Off PI bit has zero mean, which is the case for On/Off keying.

Correct detection of On PI bits is typically more critical than avoiding false detection of Off PI bits. The adaptive threshold may thus be derived to achieve the desired detection probability, as follows:

$$TH_{metric}(PS_{est}) = \mu_{metric} + x_{det} \cdot \sigma_{metric}, \quad \text{Eq (8)}$$

where $x_{det}$ is a value such that $P_{det} = Q(x_{det})$. For example, if the detection probability is 99.95%, then $x_{det} = -3.2905$. Different adaptive threshold values may be derived for different pilot strength estimates based on (1) a fixed value of $\mu_{metric}$ for all pilot strength estimates and (2) different values of $\sigma_{metric}$ for different pilot strength estimates.

The adaptive threshold is a continuous function of the standard deviation $\sigma_{metric}$, as shown in equations (6) and (8), and $\sigma_{metric}$ is a continuous function of pilot strength estimate, as shown in equation (5b). To simplify both the storage of adaptive threshold values and the comparison between the metric and the adaptive threshold, the pilot strength estimate may be partitioned into multiple bins or ranges, and the adaptive threshold may be derived for each bin. For example, the pilot strength estimate may be partitioned into 13 bins covering an overall range of 12 to 183, which corresponds to $E_c^P/I_o$ of −20 dB to −8 dB, respectively. The conversion from linear to dB is given as $E_c^P/I_o$ (dB)=10·log$_{10}$(PS$_{est}$(linear)/1152) for an example design. Each bin may cover a range of 1 dB. The adaptive threshold may then be computed for a given PS$_{est}$ value in each bin and stored in a look-up table. The adaptive threshold may also be computed for different power offsets Δ and/or different QPCH rates. Table 1 shows the adaptive threshold values for 13 bins for the full rate and power offset of Δ=−3.

TABLE 1

| PS$_{est}$ | TH$_{adap}$ |
|---|---|
| 12-15 | −30 |
| 15-19 | −25 |
| 19-23 | −20 |
| 23-29 | −16 |
| 29-37 | −12 |
| 37-46 | −9 |
| 46-58 | −6 |
| 58-73 | −3 |
| 73-91 | −1 |
| 91-115 | 2 |
| 115-146 | 4 |
| 146-183 | 6 |
| >183 | 6 |

The adaptive threshold value for each bin may be used for all pilot strength estimate values within that bin. For example, an adaptive threshold value of −12 may be used for pilot strength estimate values between 29 and 37. Alternatively, the adaptive threshold values stored in the look-up table may be interpolated (e.g., using linear interpolation) to obtain a different adaptive threshold value for each pilot strength estimate value. This interpolation can reduce errors due to quantization of the adaptive threshold for different bins.

Figure 4:
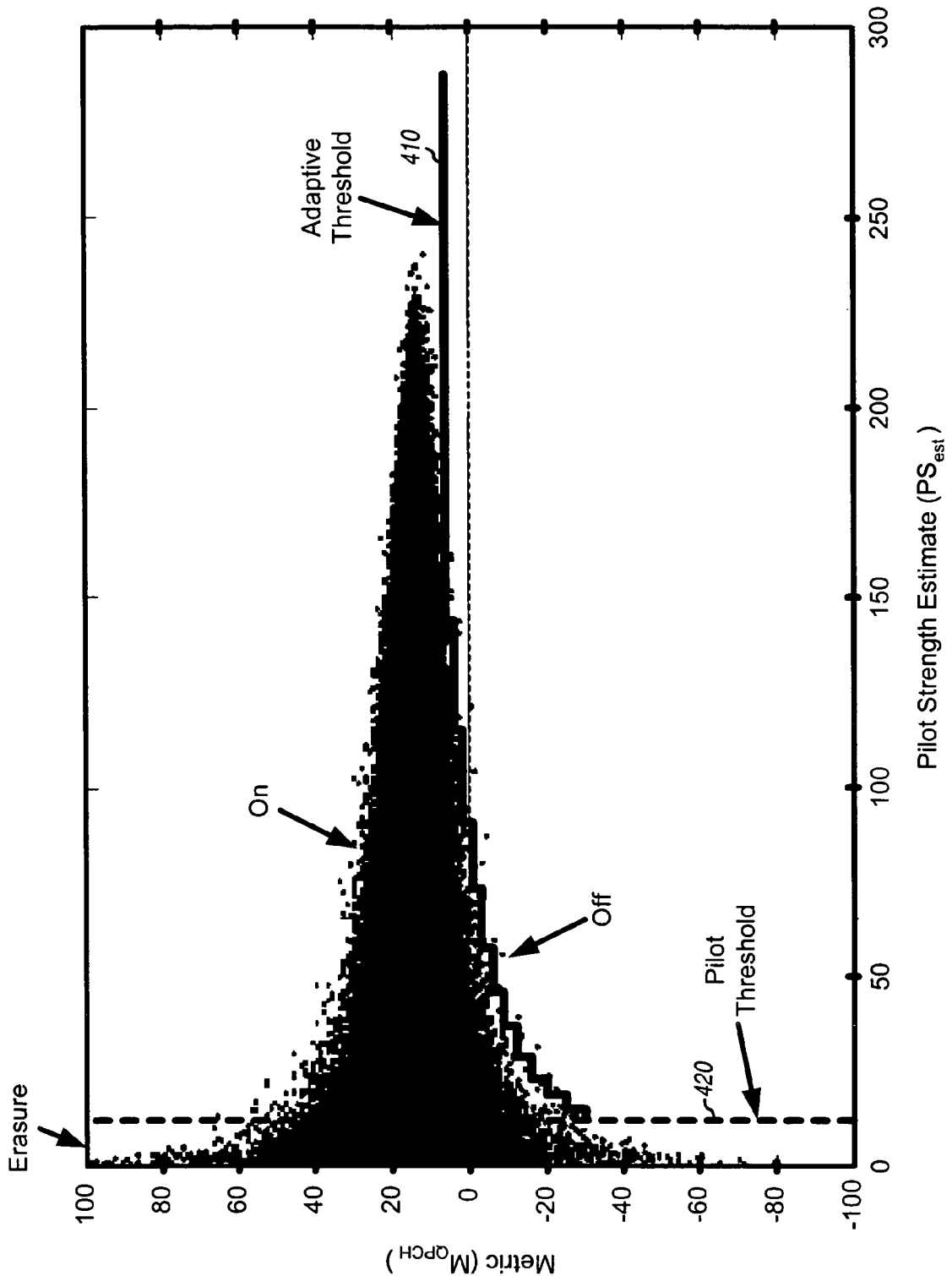
FIG. 4 shows distribution of the metric for PI bits and the adaptive threshold.

FIG. 4 shows a scatter plot of the metric and the pilot strength estimate for a large number of PI bits that are transmitted as On under a wide range of channel conditions. For each PI bit, the pilot strength estimate for that PI bit is computed as shown in equation (3) and the metric for the PI bit is computed as show in equation (4). A point is plotted in FIG. 4 for each PI bit at a location determined by the metric and the pilot strength estimate computed for that PI bit.

FIG. 4 also shows a curve 410 for the adaptive threshold and a line 420 for the pilot threshold. Curve 410 is generated based on the adaptive threshold values shown in Table 1. Line 420 is generated for pilot threshold of TH$_{pilot}$=12, which provides good result. Curve 410 and line 420 are used for PI bit detection, as described below.

Figure 5:
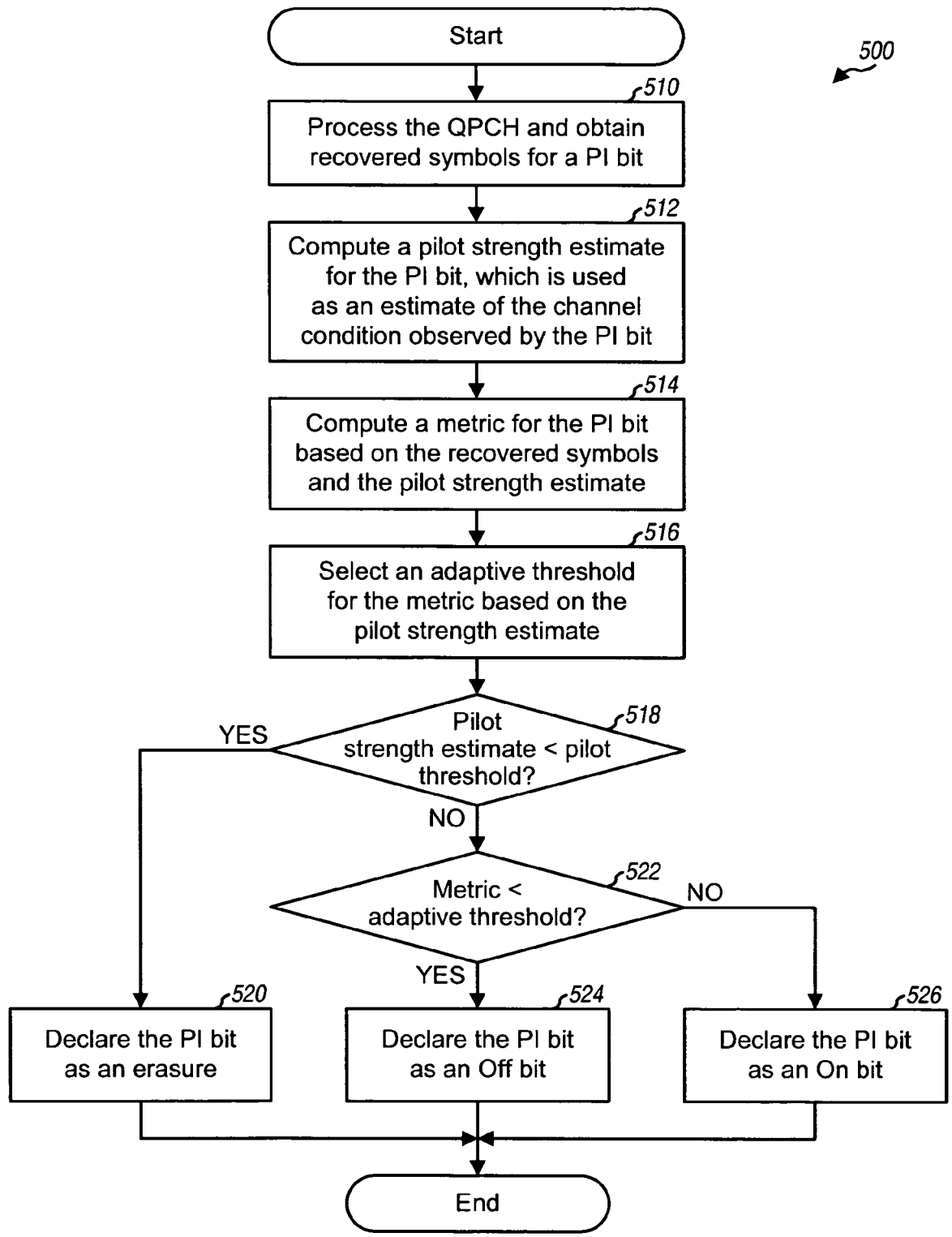
FIG. 5 shows a process for detecting a PI bit.

FIG. 5 shows a process 500 for detecting a PI bit. The QPCH is processed to obtain recovered symbols for the PI bit, as described above (block 510). A pilot strength estimate is computed for the PI bit, e.g., as show in equation (3) (block 512). The pilot strength estimate is used as an estimate of the channel condition observed by the PI bit. A metric for the PI bit is computed based on the recovered symbols and the pilot strength estimate, e.g., as shown in equation (4) (block 514). An adaptive threshold for the metric is selected based on the pilot strength estimate, e.g., using a look-up table such as the one shown in Table 1 (block 516).

A decision is then made for the PI bit based on the metric, the adaptive threshold, the pilot strength estimate, and the pilot threshold. For the embodiment shown in FIG. 5, if the pilot strength estimate is less than the pilot threshold ('Yes' for block 518), then the PI bit is declared as an erasure (block 520). A weak pilot strength estimate indicates that the channel condition is poor and that the received PI bit is too unreliable to make a decision. If the pilot strength estimate is greater than the pilot threshold ('No' for block 518) and if the metric is less than the adaptive threshold ('Yes' for block 522), then the PI bit is declared as an Off bit (block 524). Otherwise, if the pilot strength estimate is greater than or equal to the pilot threshold ('No' for block 518) and if the metric is also greater than or equal to the adaptive threshold ('No' for block 522), then the PI bit is declared as an On bit (block 526).

Referring back to FIG. 4, all points to the left of line 420, which correspond to pilot strength estimates below the pilot threshold, are declared as erasures. All points to the right of line 420 and also below curve 410 are declared as Off bits. All points to the right of line 420 and also above curve 410 are declared as On bits.

FIG. 5 shows a specific embodiment in which the metric, the adaptive threshold, the pilot strength estimate, and the pilot threshold are used to derive a decision for a PI bit. The decision may also be derived based on just the metric and the adaptive threshold. For example, the decision for the PI bit may be Off if the metric is below the adaptive threshold and On if the metric is above the adaptive threshold (no erasure for this example). As another example, the decision for the PI bit may be an erasure if the metric is below a predetermined value (e.g., −30), Off if the metric is above the predetermined value and below the adaptive threshold, and On if the metric is above the adaptive threshold.

Figure 6:
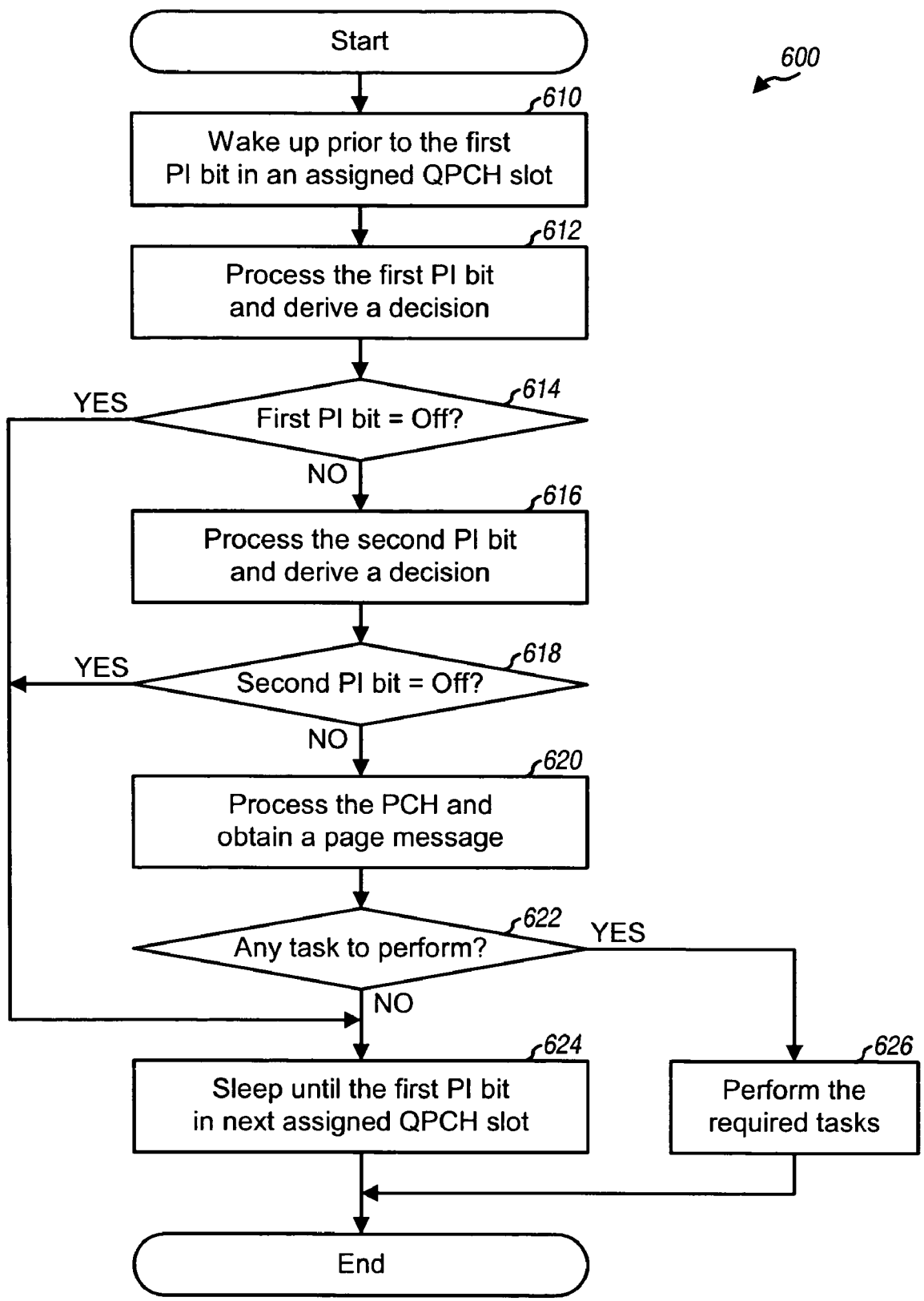
FIG. 6 shows a process for processing the QPCH and PCH to receive page messages.

FIG. 6 shows a process 600 performed by an idle wireless device to process the QPCH and PCH to receive page messages. Initially, the wireless device wakes up prior to the first PI bit in an assigned QPCH slot and warms up the necessary circuitry (block 610). The wireless device then processes the first PI bit and derives a decision for this PI bit, e.g., using process 500 in FIG. 5 (block 612). If the first PI bit is detected as an Off bit, as determined in block 614, then the wireless device proceeds to block 624 and sleeps until the next assigned QPCH slot. Otherwise, the wireless device processes the second PI bit and derives a decision for this PI bit, e.g., also using process 500 in FIG. 5 (block 616). If the second PI bit is detected as an Off bit, as determined in block 618, then the wireless device proceeds to block 624 and sleeps until the next assigned QPCH slot.

If the first and second PI bits are both not detected as Off bits, then the wireless device processes the PCH for the assigned PCH slot and obtains a page message (block 620). If the page message indicates that additional tasks need to be performed, as determined in block 622, then the wireless device remains in the active mode and performs the required tasks (block 626). Otherwise, the wireless device sleeps until the first PI bit in the next assigned QPCH slot (block 624). Although not shown in FIG. 6, the wireless device may sleep between the first and second PI bits and/or between the second PI bit and the assigned PCH slot.

The same adaptive threshold value and pilot threshold value may be used for both the first and second PI bits. Alternatively, different adaptive threshold values and/or different pilot threshold values may be used for the two PI bits.

As shown in FIG. 6, the wireless device processes the PCH if both the first and second PI bits in the assigned QPCH slot are not detected as Off (or are detected as On and/or erasures). The wireless device skips the processing of the PCH if either PI bit is detected as Off. Reception of the page message is then predicated on both (1) properly detecting the PI bits as On and (2) correctly decoding the page message sent on the PCH. An effective message error rate (MER) for the PCH may be expressed as:

$$MER_{eff} = MER_{orig} \cdot P_{QPCH} + (1 - P_{QPCH}), \quad \text{Eq (9)}$$

where $P_{QPCH}$ is an overall detection probability (for two PI bits) for the QPCH;

$MER_{orig}$ is an original message error rate for the PCH; and $MER_{eff}$ is an effective message error rate for the PCH.

$MER_{orig}$ is the probability of incorrectly decoding a page message on the PCH in reasonably good channel condition, assuming that the assigned PCH slots are always processed. MERff is the probability of missing a page message, which occurs if (1) the wireless device fails to process the PCH because of error in detecting the assigned PI bits or (2) the wireless device processes the PCH but decodes the page message in error. If the PI bits are erroneously detected, which has a probability of $(1 - P_{QPCH})$, then the page message is missed. If the PI bits are correctly detected, which has a probability of $P_{QPCH}$, then the page message is decoded in error with a probability of $MER_{orig}$.

$MER_{orig}$ is typically determined by system design. The desired $MER_{eff}$ is typically known. The required overall detection probability $P_{QPCH}$ may be computed using equation (9) based on the given $MER_{orig}$ and the desired $MER_{eff}$. The detection probability for each PI bit may then be expressed as:

$$P_{QPCH} = P_{det} \cdot P_{det} \quad \text{Eq (10)}$$

$P_{det}$ is thus determined by $MER_{orig}$ and $MER_{eff}$. For example, if $MER_{orig} = 1\%$ and the desired $MER_{eff} = 1.1\%$, which corresponds to a degradation of 10% in $MER_{orig}$, then $P_{QPCH} \geq 99.90\%$ and $P_{det} \geq 99.95\%$. The adaptive threshold may then be designed to achieve the required detection probability, $P_{det}$, using equations (6) and (8).

$MER_{orig}$ may be assumed to be approximately constant for different channel conditions. If $P_{det}$ and $P_{QPCH}$ are approximately constant for different channel conditions with the use of the adaptive threshold, then $MER_{eff}$ is also approximately constant for different channel conditions. If $MER_{orig}$ varies with channel condition, then different $P_{det}$ values may be selected for different $PS_{est}$ values such that $MER_{eff}$ is approximately constant for different channel conditions. An approximately constant $MER_{eff}$ is desirable to provide similar performance for different channel conditions.

The signaling detection techniques described herein may be used to detect various types of signaling bits such as PI bits, BI bits, CCI bits power control bits, acknowledgment bits, and so on. In general, the metric used for signaling detection is dependent on the manner in which the signaling bit is transmitted. An exemplary metric for On/Off keying is shown in equation (4). The metric may be defined in other manners for other modulation schemes such as M-PSK, M-QAM, and so on, where M may be any integer value. The adaptive threshold is dependent on the statistics (e.g., the mean and standard deviation) of the metric selected for use. The adaptive threshold is also dependent on one or more probabilities of interest such as, for example, the detection probability, the false alarm probability, and so on. The one or more probabilities of interest are typically determined by the end application for which the signaling bits are used (e.g., page messages), the desired objectives (e.g., low $MER_{eff}$, longer standby time, and so on), and possibly other factors. The signaling detection techniques may thus be tailored for other signaling bits and end applications.

The signaling detection techniques may also be used for various wireless and wireline communication systems. For clarity, the techniques have been specifically described for the QPCH and PCH in cdma2000. The techniques may also be used for other signaling channels such as, for example, a paging indicator channel (PICH) in W-CDMA. The techniques may also be used for a wireless device (as described above) as well as a base station.

The signaling detection techniques described herein may be implemented by various means. For example, these techniques may be implemented in hardware, software, or a combination thereof. For a hardware implementation, the processing units used to perform signaling detection may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the signaling detection techniques may be implemented with modules (e.g., procedures, functions, and so on) that perform the functions described herein. The software codes may be stored in a memory unit (e.g., memory unit 352 in FIG. 3) and executed by a processor (e.g., controller 350). The memory unit may be implemented within the processor or external to the processor. For example, controller 350 may implement process 500 in FIG. 5 and/or process 600 in FIG. 6.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing signaling detection in a communication system, comprising:
    computing a metric for a signaling bit based on recovered symbols;
    estimating channel condition observed by the signaling bit comprising filtering detected pilot symbols, deriving a pilot strength estimate based on the filtered pilot symbols, and providing the pilot strength estimate as the estimated channel condition;
    selecting a first threshold configured for a determined detection probability based on the estimated channel condition; and
    deriving a decision for the signaling bit based on the metric and the first threshold, wherein the metric is based on a ratio of combined inphase and quadrature components of one or more data symbols and one or more pilot symbols to the estimated channel condition derived from combining the one or more pilot symbols.

2. The method of claim 1, wherein the deriving the decision comprises:
    declaring the signaling bit to be a first value if the metric is greater than the first threshold, and
    declaring the signaling bit to be a second value if the metric is less than or equal to the first threshold.

3. The method of claim 1, wherein the deriving the decision comprises deriving the decision for the signaling bit based on the metric, the first threshold, the estimated channel condition, and a second threshold.

4. The method of claim 1, wherein the deriving the decision comprises
    declaring the signaling bit to be an erasure if the estimated channel condition is less than a second threshold,
    declaring the signaling bit to be a first value if the metric is greater than the first threshold and the estimated channel condition is greater than the second threshold, and
    declaring the signaling bit to be a second value if the metric is less than the first threshold and the estimated channel condition is greater than the second threshold.

5. The method of claim 1, wherein the selecting the first threshold comprises determining which range, among a plurality of ranges, the estimated channel condition falls within, each range being associated with a respective threshold value, and selecting the first threshold based on the range within which the estimated channel condition falls.

6. The method of claim 5, wherein the selecting the first threshold based on the range within which the estimated channel condition falls comprises providing the threshold value corresponding to the range within which the estimated channel condition falls as the first threshold.

7. The method of claim 5, wherein the selecting the first threshold based on the range within which the estimated channel condition falls comprises performing interpolation on at least two threshold values for at least two ranges, one of which is the range within which the estimated channel condition falls, to obtain a value for the first threshold.

8. The method of claim 5, further comprising:
    deriving a plurality of threshold values for the plurality of ranges to achieve a particular probability of correctly detecting the signaling bit as a designated value when transmitted as the designated value, the designated value being either '1' or '0' bit value.

9. The method of claim 5, further comprising:
    deriving a plurality of threshold values for the plurality of ranges based on a rate at which signaling bits are transmitted.

10. The method of claim 5, further comprising:
    deriving a plurality of threshold values for the plurality of ranges based on a difference between pilot power level and signaling power level.

11. An apparatus in a communication system, comprising:
    a computation unit operative to compute a metric for a signaling bit based on recovered symbols;
    an estimator operative to estimate channel condition observed by the signaling bit comprising filtering detected pilot symbols, deriving a pilot strength estimate based on the filtered pilot symbols, and providing the pilot strength estimate as the estimated channel condition;
    a look-up table operative to provide a first threshold configured for a determined detection probability based on the estimated channel condition; and
    a decision unit operative to derive a decision for the signaling bit based on the metric and the first threshold, wherein the metric is based on a ratio of combined inphase and quadrature components of one or more data symbols and one or more pilot symbols to the estimated channel condition derived from combining the one or more pilot symbols.

12. The apparatus of claim 11, wherein the decision unit is operative to derive the decision for the signaling bit based further on the estimated channel condition and a second threshold.

13. The apparatus of claim 11, wherein the look-up table is operative to store a plurality of threshold values for a plurality of ranges of channel condition, each threshold value corresponding to one range of channel condition.

14. The apparatus of claim 11, wherein the signaling bit is a paging indicator (PI) bit, a power control bit, or an acknowledgment bit.

15. An apparatus in a communication system, comprising:
    means for computing a metric for a signaling bit based on recovered symbols;
    means for estimating channel condition observed by the signaling bit comprising filtering detected pilot symbols, deriving a pilot strength estimate based on the filtered pilot symbols, and providing the pilot strength estimate as the estimated channel condition;
    means for selecting a first threshold configured for a determined detection probability based on the estimated channel condition; and
    means for deriving a decision for the signaling bit based on the metric and the first threshold, wherein the metric is based on a ratio of combined inphase and quadrature components of one or more data symbols and one or more pilot symbols to the estimated channel condition derived from combining the one or more pilot symbols.

16. The apparatus of claim 15, wherein the means for deriving the decision comprises means for deriving the decision for the signaling bit based on the metric, the first threshold, the estimated channel condition, and a second threshold.

17. The apparatus of claim 15, further comprising:
means for storing a plurality of threshold values for a plurality of ranges of channel condition, each threshold value corresponding to one range of channel condition.

18. A processor readable media for storing instructions operable to:
compute a metric for a signaling bit based on recovered symbols;
estimate channel condition observed by the signaling bit comprising filtering detected pilot symbols, deriving a pilot strength estimate based on the filtered pilot symbols, and providing the pilot strength estimate as the estimated channel condition;
select a first threshold configured for a determined detection probability based on the estimated channel condition; and
derive a decision for the signaling bit based on the metric and the first threshold, wherein the metric is based on a ratio of combined inphase and quadrature components of one or more data symbols and one or more pilot symbols to the estimated channel condition derived from combining the one or more pilot symbols.

19. The processor readable media of claim 18, and wherein the instructions are further operable to:
derive the decision for the signaling bit based on the metric, the first threshold, the estimated channel condition, and a second threshold.

20. A method of performing signaling detection in a wireless communication system, comprising:
deriving a pilot strength estimate based on pilot symbols comprising filtering detected pilot symbols and deriving the pilot strength estimate based on the filtered pilot symbols;
computing a metric for a paging indicator (PI) bit based on a ratio of combined inphase and quadrature components of one or more data symbols and one or more pilot symbols for the PI to the pilot strength estimate derived from combining the one or more pilot symbols;
selecting an adaptive threshold configured for a determined detection probability based on the pilot strength estimate; and
deriving a decision for the PI bit based on the metric and the adaptive threshold.

21. The method of claim 20, wherein the deriving the decision for the PI bit comprises deriving the decision for the PI bit based on the metric, the adaptive threshold, the pilot strength estimate, and a pilot threshold.

22. The method of claim 20, wherein the deriving the decision for the PI bit comprises declaring the PI bit to be an erasure if the pilot strength estimate is less than a pilot threshold, declaring the PI bit to be an On value if the metric is greater than the adaptive threshold and the pilot strength estimate is greater than the pilot threshold, and declaring the PI bit to be an Off value if the metric is less than the adaptive threshold and the pilot strength estimate is greater than the pilot threshold.

23. The method of claim 20, wherein the selecting the adaptive threshold comprises determining which range among a plurality of ranges the pilot strength estimate falls within, each range being associated with a respective threshold value, and providing the threshold value corresponding to the range within which the pilot strength estimate falls as the adaptive threshold.

24. The method of claim 23, further comprising:
deriving a plurality of threshold values for the plurality of ranges to achieve a particular probability of correctly detecting the PI bit as an On value when transmitted as an On value.

25. An apparatus in a wireless communication system, comprising:
means for deriving a pilot strength estimate based on pilot symbols comprising filtering detected pilot symbols and deriving the pilot strength estimate based on the filtered pilot symbols;
means for computing a metric for a paging indicator (PI) bit based on a ratio of combined inphase and quadrature components of one or more data symbols and one or more pilot symbols for the PI to the pilot strength estimate derived from combining the one or more pilot symbols;
means for selecting an adaptive threshold configured for a determined detection probability based on the pilot strength estimate; and
means for deriving a decision for the PI bit based on the metric and the adaptive threshold.

26. The apparatus of claim 25, wherein the means for deriving the decision for the PI bit comprises means for deriving the decision for the PI bit based on the metric, the adaptive threshold, the pilot strength estimate, and a pilot threshold.

27. A processor readable media for storing instructions operable to:
derive a pilot strength estimate based on pilot symbols comprising filtering detected pilot symbols and deriving the pilot strength estimate based on the filtered pilot symbols;
compute a metric for a paging indicator (PI) bit based on a ratio of combined inphase and quadrature components of one or more data symbols and one or more pilot symbols for the PI to the pilot strength estimate derived from combining the one or more pilot symbols;
obtain an adaptive threshold selected for a determined detection probability based on the pilot strength estimate; and
derive a decision for the PI bit based on the metric and the adaptive threshold.

28. The processor readable media of claim 27, and wherein the instructions are further operable to:
derive the decision for the PI bit based on the metric, the adaptive threshold, the pilot strength estimate, and a pilot threshold.

29. A method of processing a quick paging channel in a wireless communication system, comprising:
deriving a first decision for a first paging indicator (PI) bit based on a first metric value computed for the first PI bit and an adaptive threshold selected for a determined detection probability based on estimated channel condition, wherein the estimated channel condition is based on filtered detected pilot symbols, wherein a pilot strength estimate is based on the filtered pilot symbols and provided as the estimated channel condition; and
selectively deriving a second decision for a second PI bit based on a second metric value computed for the second PI bit and the adaptive threshold, wherein the metric for the signaling bit is based on a ratio of combined inphase and quadrature components of one or more data symbols and one or more pilot symbols to the estimated channel condition derived from combining the one or more pilot symbols.

30. The method of claim 29, further comprising:
entering sleep if the first decision indicates the first PI bit is an Off value, and deriving the second decision if the first decision indicates the first PI bit is not an Off value.

31. The method of claim 29, further comprising:
processing a paging channel if the first decision indicates the first PI bit is not an Off value and the second decision indicates the second PI bit is not an Off value.

32. The method of claim 29, further comprising:
deriving the adaptive threshold to achieve a particular probability of correctly detecting a given PI bit as an On value when the PI bit is transmitted as an On value.

33. The method of claim 29, further comprising:
deriving the adaptive threshold to achieve a particular message error rate for the paging channel.

34. A processor readable media for storing instructions operable to:
derive a first decision for a first paging indicator (PI) bit based on a first metric value computed for the first PI bit and an adaptive threshold selected for a determined detection probability based on estimated channel condition, wherein the estimated channel condition is based on filtered detected pilot symbols, wherein a pilot strength estimate is based on the filtered pilot symbols and provided as the estimated channel condition; and
selectively derive a second decision for a second PI bit based on a second metric value computed for the second PI bit and the adaptive threshold, wherein the metric for the signaling bit is based on a ratio of combined inphase and quadrature components of one or more data symbols and one or more pilot symbols to the estimated channel condition derived from combining the one or more pilot symbols.

35. The processor readable media of claim 34, and further for storing instructions operable to:
initiate sleep if the first decision indicates the first PI bit is an Off value, and derive the second decision if the first decision indicates the first PI bit is not an Off value.

36. The processor readable media of claim 34, and further for storing instructions operable to:
initiate processing of a paging channel if the first decision indicates the first PI bit is not an Off value and the second decision indicates the second PI bit is not an Off value.

37. An apparatus in a communication system, comprising:
means for deriving a first decision for a first paging indicator (PI) bit based on a first metric value computed for the first PI bit and an adaptive threshold selected for a determined detection probability based on estimated channel condition, wherein the estimated channel condition is based on filtered detected pilot symbols, wherein a pilot strength estimate is based on the filtered pilot symbols and provided as the estimated channel condition; and
means for selectively deriving a second decision for a second PI bit based on a second metric value computed for the second PI bit and the adaptive threshold, wherein the metric for the signaling bit is based on a ratio of combined inphase and quadrature components of one or more data symbols and one or more pilot symbols to the estimated channel condition derived from combining the one or more pilot symbols.

38. An apparatus in a communication system, comprising:
a decision unit operative to derive a first decision for a first paging indicator (PI) bit based on a first metric value computed for the first PI bit and an adaptive threshold selected for a determined detection probability based on estimated channel condition, wherein the estimated channel condition is based on filtered detected pilot symbols, wherein a pilot strength estimate is based on the filtered pilot symbols and provided as the estimated channel condition; and
the decision unit further operative to selectively derive a second decision for a second PI bit based on a second metric value computed for the second PI bit and the adaptive threshold, wherein the metric for the signaling bit is based on a ratio of combined inphase and quadrature components of one or more data symbols and one or more pilot symbols to the estimated channel condition derived from combining the one or more pilot symbols.

39. The apparatus of claim 38, further comprising:
a controller configured to cause the apparatus to enter a sleep mode if the first decision indicates the first PI bit is an Off value, and
wherein the decision unit is further configured to derive the second decision if the first decision indicates the first PI bit is not an Off value.

40. The apparatus of claim 38, further comprising:
a controller configured to process a paging channel if the first decision indicates the first PI bit is not an Off value and the second decision indicates the second PI bit is not an Off value.

41. The apparatus of claim 38, further comprising:
a signaling detector configured to derive the adaptive threshold to achieve a particular probability of correctly detecting a given PI bit as an On value when the PI bit is transmitted as an On value.

42. The apparatus of claim 38, further comprising:
a signaling detector configured to derive the adaptive threshold to achieve a particular message error rate for the paging channel.

43. An apparatus in a communication system for performing signaling detection in a wireless communication system, comprising:
a pilot strength estimator configured to derive a pilot strength estimate based on pilot symbols comprising filtering detected pilot symbols and deriving the pilot strength estimate based on the filtered pilot symbols; and
a signaling detector configured to compute a metric for a paging indicator (PI) bit based on a ratio of combined inphase and quadrature components of one or more data symbols and one or more pilot symbols for the PI to the pilot strength estimate derived from combining the one or more pilot symbols, to select an adaptive threshold configured for a determined detection probability based on the pilot strength estimate, and to derive a decision for the PI bit based on the metric and the adaptive threshold.

44. The apparatus of claim 43, wherein the signaling detector is further configured to derive the decision for the PI bit additionally based on the pilot strength estimate and a pilot threshold.

45. The apparatus of claim 43, wherein to derive the decision for the PI bit, the signaling detector is further configured to declare the PI bit to be an erasure if the pilot strength estimate is less than a pilot threshold, to declare the PI bit to be an On value if the metric is greater than the adaptive threshold and the pilot strength estimate is greater than the pilot threshold, and to declare the PI bit to be an Off value if the metric is less than the adaptive threshold and the pilot strength estimate is greater than the pilot threshold.

46. The apparatus of claim 43, wherein to select the adaptive threshold the signaling detector is further configured to determine which range among a plurality of ranges the pilot strength estimate falls within, each range being associated with a respective threshold value, and providing the threshold value corresponding to the range within which the pilot strength estimate falls as the adaptive threshold.

47. The apparatus of claim 46, wherein the signaling detector is further configured to derive a plurality of threshold values for the plurality of ranges to achieve a particular probability of correctly detecting the PI bit as an On value when transmitted as an On value.

* * * * *